United States Patent
Dufaure et al.

(10) Patent No.: US 8,242,207 B2
(45) Date of Patent: Aug. 14, 2012

(54) STYRENE/ANHYDRIDE POLYMERIC MATERIAL AND GRAFT HAVING ENHANCED PROPERTIES

(75) Inventors: Nicolas Dufaure, Bernay (FR); Sandra Grimaldi, Sainte-Foy-les-Lyon (FR); Manuel Hidalgo, Brignais (FR); Ludwik Leibler, Paris (FR); Francois-Genes Tournilhac, Paris (FR)

(73) Assignees: Arkema France, Colombes (FR); Centre National de la Recherche Scientifique, Paris (FR)

( * ) Notice: Subject to any disclaimer, the term of this patent is extended or adjusted under 35 U.S.C. 154(b) by 112 days.

(21) Appl. No.: 12/526,102

(22) PCT Filed: Feb. 1, 2008

(86) PCT No.: PCT/FR2008/050163
§ 371 (c)(1),
(2), (4) Date: Nov. 24, 2009

(87) PCT Pub. No.: WO2008/099125
PCT Pub. Date: Aug. 21, 2008

(65) Prior Publication Data
US 2010/0120983 A1 May 13, 2010

(30) Foreign Application Priority Data
Feb. 7, 2007 (FR) .................... 07 53120

(51) Int. Cl.
*C08L 51/00* (2006.01)
*C08K 3/00* (2006.01)
(52) U.S. Cl. .............................. 525/66; 524/5
(58) Field of Classification Search .............. 525/66
See application file for complete search history.

(56) References Cited

U.S. PATENT DOCUMENTS

| | | | |
|---|---|---|---|
| 2,971,939 A | | 2/1961 | Baer |
| 2,980,652 A | * | 4/1961 | Melamed et al. ........... 526/262 |
| 3,363,029 A | | 1/1968 | Verdol |
| 3,444,151 A | * | 5/1969 | Gonzalez et al. ........... 526/203 |
| 3,732,334 A | | 5/1973 | Koch et al. |
| 4,381,367 A | | 4/1983 | vonBonin |
| 4,831,367 A | | 5/1989 | Baus |
| 4,868,259 A | | 9/1989 | Burroway et al. |
| 5,115,018 A | | 5/1992 | Akkapeddi |
| 5,270,399 A | * | 12/1993 | Czornij et al. ........... 525/327.6 |
| 5,290,849 A | | 3/1994 | Lee |
| 5,650,263 A | | 7/1997 | Wakata et al. |
| 5,659,348 A | | 8/1997 | Malhotra |
| 6,063,184 A | | 5/2000 | Leikauf |
| 2002/0069989 A1 | | 6/2002 | Feret |
| 2004/0024127 A1 | | 2/2004 | Baumert |
| 2004/0054037 A1 | | 3/2004 | Abbeelevanden |
| 2007/0117909 A1 | * | 5/2007 | Seliskar et al. ........... 524/494 |
| 2008/0220271 A1 | | 9/2008 | Baumert |

FOREIGN PATENT DOCUMENTS

| | | |
|---|---|---|
| EP | 0393899 | 6/1933 |
| EP | 0412832 | 2/1991 |
| EP | 0810323 A2 | 12/1997 |
| EP | 1342764 A2 | 9/2003 |
| GB | 1053791 | 1/1967 |
| WO | 0248459 A2 | 6/2002 |
| WO | WO 2006/056690 | 6/2006 |
| WO | 2006085007 A1 | 8/2006 |

OTHER PUBLICATIONS

International Search Report issued in PCT/FR2008/050163 filed Feb. 1, 2008, mailed Jul. 30, 2008.
Translation of the Written Opinion of the International Searching Authority issued for PCT/FR/2008/050163, on Aug. 11, 2009.

* cited by examiner

*Primary Examiner* — Ling Choi
*Assistant Examiner* — Hui Chin
(74) *Attorney, Agent, or Firm* — RatnerPrestia

(57) ABSTRACT

A polymeric material from the styrene family, consisting of macromolecular chains grafted by nitrogen-containing heterocyclic groups; wherein the macromolecular chains consist of a polymeric backbone to which a grafted agent is attached by at least one covalent bond, the grafting agent comprises, in a single molecule, one or more associative groups capable of being bound by hydrogen bonds, and one or more reactive groups capable of forming covalent bonds with the polymeric backbone, at least one of the associative groups of the modifier is an imidazolidone heterocyclic ring. The polymeric material of the invention can also be blended with other materials such as other polymers, and can thus be modified by elastomeric phases that enhance the impact strength thereof.

13 Claims, 1 Drawing Sheet

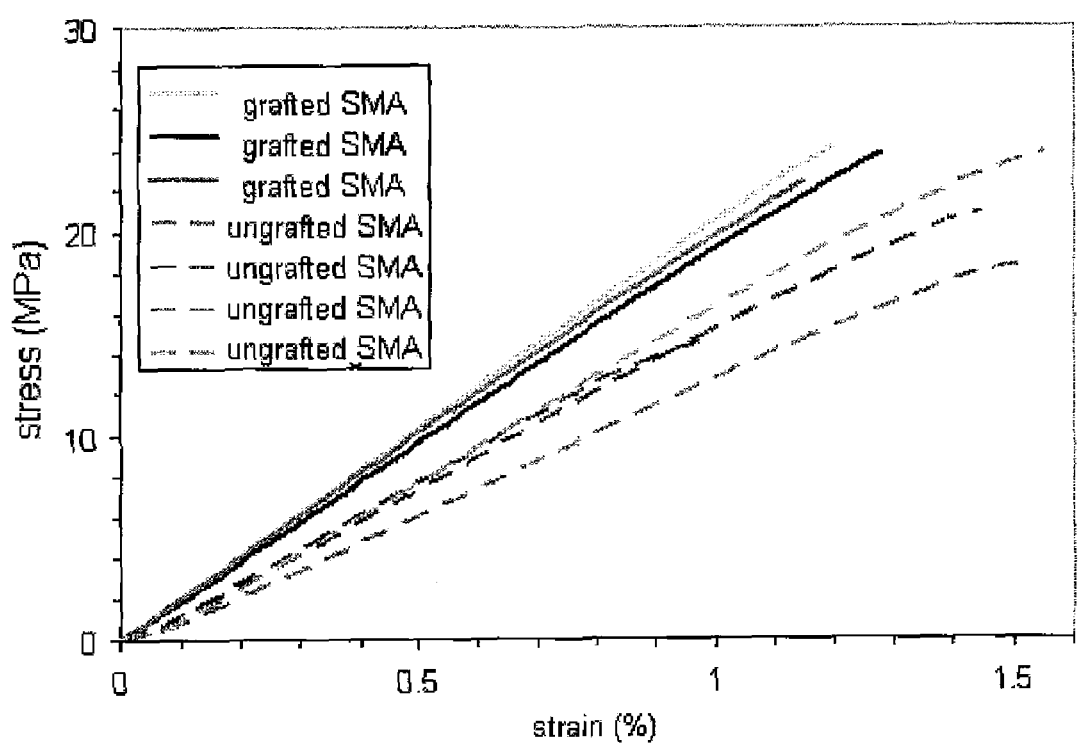

STYRENE/ANHYDRIDE POLYMERIC MATERIAL AND GRAFT HAVING ENHANCED PROPERTIES

This application claims benefit, under U.S.C. §119 or §365 of FR 0753120 filed Feb. 7, 2007; and PCT application PCT/FR2008/050163 filed Feb. 1, 2008.

The present invention pertains to the field of styrenic polymers composed of macromolecular chains grafted with nitrogen-containing heterocycles and able to combine via hydrogen bonds. It also relates to the compositions comprising such materials, and to their uses.

Thermoplastics are useful in manufacturing articles in the sectors of the automotive industry and transport, the industry of electrical and electronic appliances, including household electricals, the packaging industry, such as that of microwavable food packaging, in the construction and decoration industry, in the mechanical industry and, in general, in the industry of plastics, which relates to many and varied applications such as in toys or office goods.

One of the most widely used classes of thermoplastics for these applications is that of rigid styrenic thermoplastics and, more particularly, that of rigid and transparent styrenic thermoplastics, such as polystyrene, which exhibits a number of advantages in this type of application (optical and mechanical properties, low cost, ease of use, etc.), but which, unfortunately, does not exhibit very high heat or solvent resistance.

The skilled person has therefore sought to copolymerize the styrene with other monomers, capable of providing the eventual copolymer with an improvement in its heat and solvent resistance, in relation to homopolystyrene, while retaining good processability properties (capacity to be readily transformable). Accordingly patent U.S. Pat. No. 2,971,939 describes a polymerization process producing copolymers of styrene and maleic anhydride or blends of a styrene homopolymer with a copolymer of styrene and maleic anhydride, which have an improved heat distortion temperature while retaining the processability of the material.

The applicant has now found a new polymer material exhibiting enhanced thermal properties (e.g. glass transition temperature) and/or enhanced solvent resistance properties while retaining or likewise improving its mechanical properties (e.g. mechanical moduli) and rheological properties (e.g. the capillary viscosity or the low-shear viscosity) relative to the abovementioned prior-art polymer material.

BRIEF DESCRIPTION OF DRAWINGS

FIG. 1 shows the stress-strain curves of the UDETA-grafted SMA and ungrafted SMA according to the mechanical 3-point flexural test. The greater slope of the plots of stress as a function of strain for the grafted samples relative to the ungrafted samples conveys the significant increase in the mechanical modulus.

The invention provides a graft copolymer obtained from the grafting:

of a copolymer (II) obtained from the copolymerization of at least two monomers, (i) the first monomer being selected from styrene and its derivatives and (ii) the second monomer containing at least one anhydride function, with molecules M-R—X (I) containing at least one unit (M) selected from the units (1) to (4):

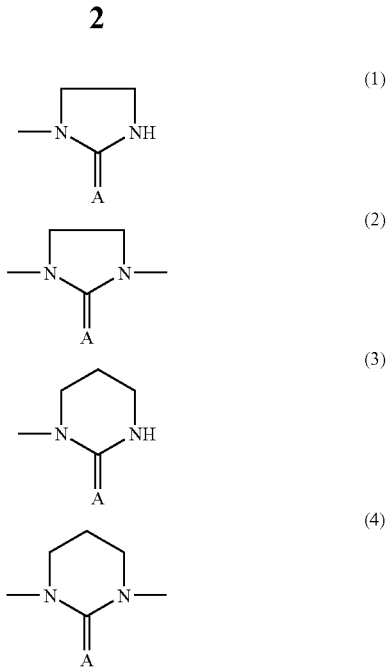

with A=oxygen, sulphur or NH;

and containing at least one chemical function (X) selected from a halogen, a primary or secondary amine function, an alcohol function, a thiol function, a carboxylic acid function or a derivative of this function and an epoxy function, the unit (M) and said function (X) being connected by a rigid or flexible chain (R).

In one embodiment the graft copolymer is characterized in that the backbone copolymer (II) for grafting is obtained from the copolymerization of a mixture of monomers containing between 0.5% and 50% (% by weight, relative to the total mixture of monomers) of monomer containing an anhydride function.

In one embodiment the copolymer (II) is characterized in that the monomer containing an anhydride function is maleic anhydride.

In one embodiment the graft copolymer is characterized in that the molecules (I) are obtained from the reaction of urea with at least one compound selected from alkyleneamines, amines, amino alcohols and amides.

In one embodiment the graft copolymer is characterized in that the molecules (I) are obtained from the reaction of urea with at least one compound containing at least one primary amine function (—NH2) and at least one secondary amine function (—NH—), said functions being connected by a carbon chain containing at least two carbon atoms.

In one embodiment the graft copolymer is characterized in that the function (X) is a primary or secondary amine function or an alcohol function.

In one embodiment the graft copolymer is characterized in that the unit (M) of the molecule (I) is the unit (1), which is an imidazolidone heterocycle with A=oxygen.

In one embodiment the graft copolymer is characterized in that the molecule (I) is selected from the molecule UTETA, the molecule UTEPA and the molecule UDETA.

In one embodiment the graft copolymer is characterized in that the chain (R) is a linear or branched alkyl chain composed of one to 30 carbon atoms, a ring or a succession of alkyl or aryl radicals joined by bridges —C(O)O—, OC(O), C(O), —O—, —S—, —NH— with, preferably, a molecular mass of R which is less than 1000 g/mol and very preferably less than 500 g/mol.

In one embodiment the graft copolymer is characterized in that the average number of grafts is greater than 2 grafts per macromolecular chain.

The invention likewise provides a composition comprising a graft copolymer as defined above and at least one other polymer.

The invention also relates to the use of the abovementioned graft copolymer or of the composition set out above for manufacturing articles intended for the sectors of vehicles, transport, electricity, electronics, information technology, medicine, packaging, including microwavable food packaging, decoration, construction, mechanics, toys and/or household electricals.

In one embodiment the invention relates to the use of the graft copolymer:
- as a compatibilizer in polymer blends
- as a component of a polymer/additives masterbatch used for additizing polymers which are identical to or different from the graft copolymer.

The invention also relates to a process for synthesis of a graft copolymer according to the invention, characterized in that it comprises either (i) a step of dissolving molecules (I) and the copolymer (II) in an appropriate solvent, or (ii) a step of contacting the molecules (I) with the copolymer (II) in the melt state, without solvent, in an extruder, a calender or any other mixer.

The thermoplastic material of the invention is obtained by reacting:
- molecules M-R—X (I) containing at least one unit (M) selected from units (1) to (4) below and at least one function (X), preferably selected from primary amine, secondary amine and alcohol functions, and also a rigid or flexible spacer (R)
- with a copolymer (II) obtained from the copolymerization of at least two monomers, namely a styrenic monomer and a monomer containing an anhydride function.

The copolymer (II) is obtained from the copolymerization of at least two different monomers: a styrenic monomer, preferably styrene, and a monomer containing an anhydride function, preferably maleic anhydride. This copolymer (II) is abbreviated SMA. The copolymers SMA may also be obtained from copolymerizations with one or more other, further monomers such as, for example, acrylic comonomers such as alkyl(meth)acrylates.

The copolymer (II) is obtained from the copolymerization of a mixture of monomers comprising by weight, relative to the total mixture of monomers, between 0.5% and 50%, and preferably between 15% and 30%, of monomer containing an anhydride function.

At the time of the reaction of the copolymer (II) with the molecules (I), the anhydride functions of said copolymer (II) are opened by the function (X) of said molecules (I). The molecules (I) become grafted by covalent bond(s) to the macromolecular chain of said copolymer (II). Although the stoichiometry of the reaction can be adjusted such that each anhydride function of the copolymer (II) undergoes grafting, it is preferable, especially when the proportion of anhydride functions in the copolymer (II) exceeds 5% by weight, for the degree of grafting to the anhydride functions to be non-total; in other words, it is often preferable for free anhydride functions to remain.

The structure of the graft copolymer is consequently modified on the molecular scale in that at least some of the macromolecular chains of said copolymer contain grafts, comprising at least one of the units (1) to (4) below, said grafts being capable of combining with one another by reversible physical bonds such as hydrogen bonds. An average of more than two grafts per chain of the copolymer (II) is needed for it to be possible for a macromolecular network to be formed by virtue of hydrogen bonds. Without the explanation given limiting or confining in any way the scope of the invention, the reversible physical interactions that take place between grafts carried by different chains of the graft copolymer, referred to as intermolecular physical interactions, are thought to make a decisive contribution to the improvement that is observed in the properties of the graft copolymer relative to the properties of the ungrafted copolymer.

The molecule M-R—X (I) comprises, united in a single molecule, at least one unit (M) selected from units (1) to (4) below, said unit being capable of interacting by hydrogen bonding, and at least one function (X) which is capable of forming covalent bonds with the copolymer (II). The unit or units (M) and the function or functions (X) are joined to one another by a rigid or flexible chain (R).

The units (M) distinctively include the following:

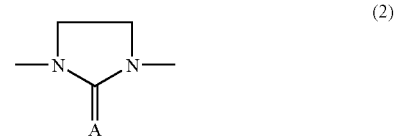

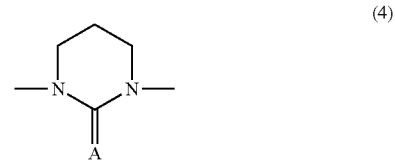

with A=oxygen, sulphur or NH, advantageously oxygen.

The unit is preferably the unit (1) with A=oxygen, which is an imidazolidone heterocycle.

The function (X) may be selected from a halogen, a primary or secondary amine function, an alcohol or thiol function, a carboxylic acid function or a derivative of these functions (ester, thioester, amide) and an epoxy function. Preferably (X) is a primary or secondary amine function or an alcohol function.

The rigid or flexible chain (R) may be a hydrocarbon chain which carries one or more heteroelements. It may be a linear or branched hydrocarbon chain composed of one to 30 carbon atoms, a ring or a succession of alkyl or aryl elements joined by bridges —C(O)O—, OC(O), C(O), —O—, —S—, —NH—. The chain R according to the invention will have a molecular mass of less than 1000 g/mol and preferably less than 500 g/mol. Advantageously, when these bridges are present in the chain (R), and especially when they are amide bridges C(O)NH, they are capable of combining by hydrogen bonds.

If necessary, the grafting reaction of the molecule (I) to the macromolecular chain of the copolymer (II) will be able to produce further groups which are associative by hydrogen bonding, and especially amide —C(O)NH— or —NHC(O)— bridges. Thus, when the unit X of the molecule (I) is an amine unit, the grafting reaction of the molecule (I) to the macromolecular chain of the copolymer (II) will be able to give rise to amide or imide bonds between the unit X and the carboxyl groups of the anhydride units of the copolymer (II).

The molecules (I), comprising at least one unit selected from units (1) to (4) above, may be obtained from the reaction of urea with a molecule containing at least one primary amine function (—NH2) and at least one secondary amine function (—NH—) which are separated by at least 2 carbon atoms, and more particularly are obtained from the reaction of urea with alkyleneamines, amines, amino alcohols or amides. The molecules (I) are preferably selected from molecules (I) containing units (1) with A=oxygen, and are obtained from the reaction of urea with a polyalkylene-amine.

Mention may be made of the following:

the molecule UTETA: 1-(2-[(2-aminoethyl)amino]ethyl) imidazolidin-2-one, obtained from the reaction of urea with triethylenetetramine (TETA);

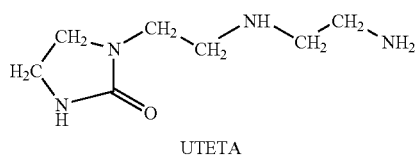

UTETA the molecule UTEPA: 1-(2-{2-[(2-aminoethylamino] ethyl}amino)ethyl]-imidazolidin-2-one obtained from the reaction of urea with tetraethylene-pentamine (TEPA);

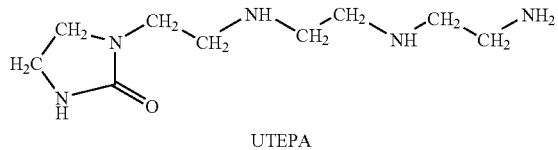

UTEPA the molecule UDETA: 2-aminoethylimidazolidinone or 1-(2-aminoethyl)-imidazolidin-2-one, obtained from the reaction of urea with diethylene-triamine (DETA);

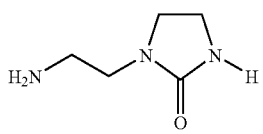

and also molecules such as

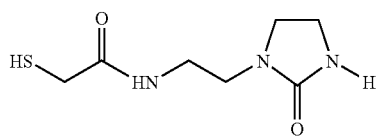

-continued

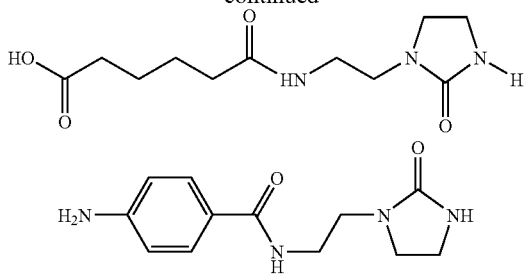

obtained, for example, from the reaction of UDETA with, respectively, a thio acid or a thio ester, a diacid or an acid ester and an amino acid or an amino ester.

The copolymer (II) is a copolymer obtained from the copolymerization of at least 2 monomers, (i) the first monomer being selected from styrene and its derivatives in which at least one of the aliphatic or aromatic hydrogens of the styrene is substituted, such as, for example, □-methylstyrene or 4-styrenesulphonate, and (ii) the second monomer containing an anhydride function, such as, for example, maleic anhydride.

Preferably the copolymer is obtained by copolymerization of styrene and maleic anhydride.

The reaction of the molecules (I) with the copolymer (II) may take place in solution or in the melt state. The molecules (I) and the copolymer (II) may be dissolved in an appropriate solvent, such as chloroform, by selecting the reaction temperature such that the reaction takes place within a reasonable time of from several minutes to several hours. Alternatively the molecules (I) may be contacted with the copolymer (II) in the melt state, without solvent, in such a way that this contact may take place in thermoplastic polymer converting equipment that is well known to the skilled person, such as extruders, calenders and other mixers.

Generally speaking, the reaction of the molecules (I) with the copolymer (II) may take place by any process for chemical modification of polymers that is known to a person skilled in the art, such as, for example, modification in solution, in which the reaction is performed in a common solvent for the polymer and for the reactants, followed by purification by precipitation; or modification in the melt state, in which the reaction is performed by contacting the polymer and the reactants in the melt state in a suitable apparatus such as, for example, an internal mixer, or a continuous or batch co-kneader, or a single-screw or co- or counter-rotating twin-screw extruder.

The nature of the intermolecular physical interactions produced by the grafting carried out according to the invention means that the resistance of the polymer to the customary solvents is enhanced, while leaving the possibility of redissolving the material in quite specific solvents such as benzyl alcohol, whereas the improvement in the solvent resistance by chemical crosslinking rules out any possible dissolution.

The graft copolymer according to the invention may be blended with at least one other polymer to produce blends which are thermodynamically compatible, or to produce two-phase or multi-phase dispersions such as those obtained when the thermoplastic SMA polymer is blended with a polymer capable of providing, in the eventual blend, the presence of an elastomeric phase which is capable of reinforcing the impact resistance properties of the material. Polymers capable of providing an elastomeric phase in the blend include, as non-exclusive examples, polymers or copolymers of butadiene or of isoprene, such as polybutadiene, such as SBR rubbers (styrene-butadiene rubbers), such as NBR rubbers (nitrile-butadiene rubbers), such as ABS (acrylonitrile-butadiene-styrene copolymers), such as MBS (methyl methacrylate-butadiene-styrene copolymers), such as block copolymers, for instance SBS (polystyrene-polybutadiene-polystyrene), SIS (polystyrene-polyisoprene-polystyrene) and SBM (polystyrene-polybutadiene-polymethyl methacrylate), and such as hydrogenated versions of these polymers and copolymers based on butadiene or isoprene.

Mention may also be made of acrylic elastomeric polymers or copolymers such as the copolymers of styrene and butyl acrylate or the elastomeric copolymers based on polyolefins, such as ethylene-propylene copolymer elastomers, such as ethylene-propylene-diene copolymer elastomers, such as polyisobutylene, such as modified ethylene-propylene copolymer elastomers and such as modified ethylene-propylene-diene (EPDM) copolymer elastomers.

The graft copolymer according to the invention may also be blended with at least one other polymer that does not contain an elastomeric phase, such as, for example, polystyrene, SAN (styrene-acrylonitrile copolymer) or SM (styrene-methyl methacrylate copolymer).

The polymer or polymers which may be blended with the graft polymer of the invention may optionally be themselves grafted with molecules containing grafts such as those of the invention or of chemically different type. Advantageously the use of polymers containing grafts which are able to form hydrogen bonds with the grafts of the polymer of the invention is beneficial to the quality of the blend. The graft copolymer of the invention is capable of blending more effectively with pigments, fillers or other additives that are commonly used in the plastics industry than is the ungrafted base copolymer. The copolymer of the invention advantageously may be used in masterbatches, which are polymer/additive premixes containing a high concentration of additives and which, by dilution in the polymer to be additized, will serve for better dispersing of said additives.

Lastly, the graft copolymer of the invention may also be used as a compatibilizer between two other polymers of a blend.

DESCRIPTION OF A WORKING EXAMPLE OF THE INVENTION

Example 1

Extruder Grafting of an SMA Copolymer with UDETA

The SMA copolymer before grafting is an Aldrich product containing 14% by weight of maleic anhydride. Its number-average molecular mass, Mn, is 85 000 g/mol and its weight-average molecular mass, Mw, is 188 000 g/mol. Grafting is carried out in a DSM Micro 15 Compounder microextruder under a stream of nitrogen. The SMA is pretreated at 120° C. for 12 hours in an oven under vacuum, in order to reform the anhydrides, which are liable to undergo hydrolysis. 12 g of the SMA are then mixed with 400 mg of UDETA with a molar purity of greater than 95%. The molecular mass of the UDETA molecule used to graft the SMA is 129 g/mol. The extrusion temperature is 220° C. for screws which rotate at 50 revolutions per minute. The material retains good processing properties. The extruded product is subsequently introduced into a DACA Instruments injection-moulding machine, with an injection temperature of 300° C. and a mould at 145° C. For comparison, the ungrafted SMA copolymer is also injected at 300° C. with a mould at 140° C.

Mechanical 3-Point Flexural Test:

A mechanical test in three-point flexural mode is then carried out on bars in the shape of rectangular prisms, using a DMA TA 2980 instrument. An increasing-force ramp of 4N/min is applied and the mechanical modulus in flexure is thus determined. The UDETA-grafted SMA has a modulus of 2.0 GPa, while the initial, ungrafted SMA has a modulus of 1.5 GPa, representing an increase of more than 33%.

Mechanical Tensile Test:

A tensile test is performed in an Instron 5564 tensile machine at ambient temperature and with a pulling speed of 2 mm/min on dumbbell specimens whose central portion measures 25 mm in length by 4 mm in width and 1.6 mm in thickness. This test demonstrates an increase in the Young's modulus, which passes from 1.2 GPa for the ungrafted SMA to 1.4 GPa for the grafted SMA, representing an improvement of more than 16%.

Solvent Resistance Test:

25 mg of ungrafted SMA are weighed out and introduced into a flask containing 1 ml of chloroform. The same operation is repeated with 25 mg of grafted SMA in 1 ml of chloroform. The two solutions are subjected to stirring. After 8 hours, the grafted SMA has swollen but does not dissolve, whereas the ungrafted SMA dissolves rapidly. Identical results are found when the same experiment is reproduced using tetrahydrofuran in place of chloroform.

40 mg of ungrafted SMA are weighed out and introduced into a flask containing 2 ml of benzyl alcohol. The same operation is repeated with 40 mg of grafted SMA in 2 ml of benzyl alcohol. The two solutions are heated at 125° C. and subjected to stirring. After 1 day, the grafted SMA has dissolved, making the solution turbid, and the ungrafted SMA has dissolved completely.

Thermal Analysis:

Samples of grafted SMA and ungrafted SMA each of 10 mg are analysed by calorimetry using a DSC TA Q1000 instrument operating in T4 mode. The glass transition temperatures of these two materials are estimated with heating and cooling rates of 10° C./min. The grafted SMA has a glass transition temperature that is 5.4° C. higher than the ungrafted SMA (135.5° C. and 130.1° C. respectively).

Example 2

Extruder Grafting of an SMA Copolymer with a Smaller Amount of UDETA

The SMA copolymer before grafting is the same as that of Example 1. Grafting is carried out in a DSM Micro 15 Compounder microextruder under a stream of nitrogen. The SMA is pretreated at 120° C. for 12 hours in an oven under vacuum, in order to reform the anhydrides, which are liable to undergo hydrolysis. 12 g of the SMA are then mixed with 170 mg of UDETA with a molar purity of greater than 95%. The extrusion temperature is 220° C. for screws which rotate at 50 revolutions per minute. The material retains good processing properties. The extruded product is subsequently introduced into a DACA Instruments injection-moulding machine, with an injection temperature of 300° C. and with a mould at 140° C.

Mechanical 3-Point Flexural Test:

A mechanical test in three-point flexural mode is then carried out on bars in the shape of rectangular prisms, using a DMA TA 2980 instrument. An increasing-force ramp of 4N/min is applied and the mechanical modulus in flexure is thus determined. The grafted SMA has a modulus of 1.84

GPa, while the initial SMA has a modulus of 1.5 GPa, representing an increase of more than 22%.

Solvent Resistance Test:

25 mg of ungrafted SMA are weighed out and introduced into a flask containing 1 ml of chloroform. The same operation is repeated with 25 mg of grafted SMA in 1 ml of chloroform. The two solutions are subjected to stirring. The grafted SMA dissolves, but makes the solution very hazy, whereas the solution with the ungrafted SMA is completely transparent.

Identical results are found when the same experiment is reproduced using tetrahydrofuran.

40 mg of ungrafted SMA are weighed out and introduced into a flask containing 2 ml of benzyl alcohol. The same operation is repeated with 40 mg of grafted SMA in 2 ml of benzyl alcohol. The two solutions are heated at 125° C. and subjected to stirring. After 1 day, the grafted SMA has dissolved, making the solution very slightly hazy, and the ungrafted SMA has dissolved completely.

Thermal Analysis.

Samples of grafted SMA and ungrafted SMA each of 10 mg are analysed by calorimetry using a DSC TA Q1000 instrument operating in T4 mode. The glass transition temperatures of these two materials are estimated with heating and cooling rates of 10° C./min. The grafted SMA has a glass transition temperature of 2.7° C. higher than the ungrafted SMA (132.7° C. and 130.1° C. respectively).

The graft copolymer according to the invention, in pure form, constitutes a new, rigid and transparent thermoplastic material. The graft copolymer according to the invention, integrated in a composition, constitutes a new, transparent, translucent or opaque thermoplastic material. The graft copolymer of the invention, in pure form or as part of a composition, constitutes a thermoplastic material which, after application steps which are well known to the skilled person (such as extrusion, injection moulding, thermoforming or calendering), allows the manufacture of plastics articles. Said articles may have applications in all of the fields in which plastics are used, such as the field of motor vehicles, transport, electricity, electronics, information technology, medicine, packaging, including microwavable food packaging, decoration, construction, mechanical engineering, toys and household electricals.

The graft copolymer according to the invention may also play a part as:
- a compatibilizer in a composition comprising among other components at least two polymers belonging to different polymer classes
- a component of a masterbatch with a high concentration of additives (such as pigments or fillers) for additizing polymers or copolymers which are identical or different from that of the invention.

Example 3

Twin-Screw Extruder Grafting of a Commercial Grade of SMA with UDETA

The SMA copolymer before grafting is a Xiran, produced by Polyscope, containing 22% by weight of maleic anhydride. Its weight-average molecular mass, Mw, is 110 000 g/mol. The grafting of UDETA onto SMA is carried out in a process of reactive extrusion on a Leistritz LSM30-34 twin-screw extruder, with a diameter of 34 mm and a length-to-diameter ratio of 30. The temperature profile is regulated at 200° C. flat, the flow rate at 20 kg/h and the rotary speed of the screws at 300 revolutions per minute. The SMA is introduced in a hopper, and UDETA is injected in zone 2 by means of a membrane metering micropump (Prominent); the flow rate is monitored by loss of weight on a balance. A degassing zone allows for removal of any volatile compounds. The UDETA, with a purity of more than 80% by weight, is introduced at 1.5% by mass, relative to the SMA-UDETA combination. At the exit of the extruder, the product is cooled and pelletized. The SMA is also extruded on its own.

Infra-Red Analysis

Samples of grafted and ungrafted SMA are analysed by infra-red spectroscopy by germanium crystal ATR. The spectrometer is a protected 460 ESP from Nicolet; the ATR cell is a Thunderdome from Spectra-tech. The absorption band of the anhydride, which is situated at 1775 cm$^{-1}$, is reduced after grafting, while a band appears at around 1705 cm$^{-1}$, which shows that grafting has indeed taken place.

Rheological Analysis

Tests in a capillary rheometer and a rotational rheometer are performed on samples of grafted and ungrafted SMA (both extruded), both of which have been stored in an oven at 150° C. under vacuum overnight in order to remove any trapped gases. These measurements are performed at 230° C.

Capillary rheometer: a Göttfert Rheotester capillary rheometer with a die possessing a length-to-diameter ratio of 30 is used. A Rabinowitsch correction is applied for all of the tests. The viscosity values 1 are presented in Table 1 below:

TABLE 1

|  | Viscosity at 11 s$^{-1}$ |
| --- | --- |
| Ungrafted SMA | 1483 Pa · s |
| Grafted SMA | 2425 Pa · s |

An increase is observed in the low-shear viscosity after grafting.

Rotational rheometer: a Physica MCR 301 rotational rheometer equipped with parallel plates with a diameter of 25 mm is used in frequency sweep mode. The deformation applied varies between 2% and 6%, so as to remain in the linear range. The moduli of the complex viscosities measured at two frequencies are presented in Table 2 below:

TABLE 2

|  | Complex viscosity at 0.628 rad/s | Complex viscosity at 135 rad/s |
| --- | --- | --- |
| Ungrafted SMA | 1900 | 591 |
| Grafted SMA | 3040 | 610 |

The viscosities are virtually identical at high frequencies, but that of the grafted SMA is very much higher than that of the ungrafted SMA at low frequencies. The ease of shaping of these products (high shear rate), also referred to as "processability", will be little affected, since it is governed by the high-shear viscosity, whereas operations involving low shear rates (such as the melt strength) will be greatly modified by the grafting; in other words, the grafted SMA will flow less under its own weight.

Example 4

Twin-Screw Extruder Grafting of a Commercial Grade of SMA with Two Different Proportions of UDETA The SMA copolymer before grafting is a Xiran SZ26080, produced by Polyscope, containing 26% by weight of maleic anhydride. Its weight-average molecular mass, Mw, is 80 000 g/mol. The grafting of UDETA onto SMA is carried out in a process of reactive extrusion on a Leistritz LSM30-34 twin-screw extruder, with a diameter of 34 mm and a length-to-diameter ratio of 30. The temperature profile is regulated at 200° C. flat, the flow rate at 20 kg/h and the rotary speed of the screws at 300 revolutions per minute. The SMA is introduced in a hopper, and UDETA is injected in zone 2 by means of a membrane metering micropump (Prominent); the flow rate is monitored by loss of weight on a balance. A degassing zone allows for removal of any volatile compounds. The UDETA, with a purity of more than 80% by weight, is introduced at 1.5% and 3% by mass. At the exit of the extruder, the product is cooled and pelletized.

Infra-Red Analysis

Samples of grafted and ungrafted SMA are analysed by infra-red spectroscopy by germanium crystal ATR. The spectrometer is a protected 460 ESP from Nicolet; the ATR cell is a Thunderdome from Spectra-tech. The greater the level of grafting, the more the extent to which the absorption band of the anhydride, which is situated at 1775 cm$^{-1}$, is reduced, and the more the band at around 1705 cm$^{-1}$ increases, showing that grafting has indeed taken place.

Thermal Analysis

Samples of grafted SMA and ungrafted SMA (both extruded) ate analysed by calorimetry using a Netzsch DSC 204F1 instrument. The glass transition temperatures of these two materials are estimated with heating and cooling rates of 20° C./min. The glass transition temperature is measured on the second heating. The ungrafted SMA has a glass transition temperature of 156° C., in comparison to 158.1° C. for the grafted SMA with 1.5% of UDETA, and 158.7° C. for the grafted SMA with 3% of UDETA.

Rheological Analysis

Tests in a capillary rheometer are carried out on grafted and ungrafted SMA samples, both treated overnight in an oven at 150° C. under vacuum in order to remove any trapped gases. These measurements are made at 230° C. A Göttfert Rheotester capillary rheometer with a die possessing a length-to-diameter ratio of 30 is used. A Rabinowitsch correction is applied for all of the tests. The following viscosity values are obtained:

TABLE 3

|  | Viscosity at 12 s$^{-1}$ |
| --- | --- |
| Grafted SMA with 1.5% of UDETA | 2920 Pa · s |
| Grafted SMA with 3% of UDETA | 3870 Pa · s |

An increase in the degree of grafting produces an increase in the low-shear viscosity. Operations involving low shear rates (such as melt strength) will be greatly modified by the grafting; the greater the extent to which the SMA is grafted with UDETA, the less it will flow under its own weight.

Example 5

Twin-Screw Extruder Grafting of a More Fluid Commercial Grade of SMA with Two Different Proportions of UDETA The SMA copolymer before grafting is a Xiran SZ22065, produced by Polyscope, containing 22% by weight of maleic anhydride. Its weight-average molecular mass, Mw, is 65 000 g/mol. The grafting of UDETA onto SMA is carried out in a process of reactive extrusion on a Leistritz LSM30-34 twin-screw extruder, with a diameter of 34 mm and a length-to-diameter ratio of 30. The temperature profile is regulated at 200° C. flat, the flow rate at 20 kg/h and the rotary speed of the screws at 300 revolutions per minute. The SMA is introduced in a hopper, and UDETA is injected in zone 2 by means of a membrane metering micropump (Prominent); the flow rate is monitored by loss of weight on a balance. A degassing zone allows for removal of any volatile compounds. The UDETA, with a purity of more than 80% by weight, is introduced at 1.5% and 3% by mass. At the exit of the extruder, the product is cooled and pelletized. The SMA is also extruded on its own.

Infra-Red Analysis

Samples of grafted and ungrafted SMA are analysed by infra-red spectroscopy by germanium crystal ATR. The spectrometer is a protected 460 ESP from Nicolet; the ATR cell is a Thunderdome from Spectra-tech. The greater the level of grafting, the more the extent to which the absorption band of the anhydride, which is situated at 1775 cm$^{-1}$, is reduced, and the more the band at around 1705 cm$^{-1}$ increases, showing that grafting has indeed taken place.

Thermal Analysis

Samples of grafted SMA and ungrafted SMA (all extruded) are analysed by calorimetry using a Netzsch DSC 204F1 instrument. The glass transition temperatures of these two materials are estimated with heating and cooling rates of 20° C./min. The glass transition temperature is measured on the second heating. The ungrafted SMA has a glass transition temperature of 149.1° C., in comparison to 152.4° C. for the grafted SMA with 1.5% of UDETA, and 153.7° C. for the grafted SMA with 3% of UDETA.

Rheological Analysis

Tests in a capillary rheometer are carried out on grafted SMA samples and on the two ungrafted SMAs containing different proportions of UDETA, both being treated overnight in an oven at 150° C. under vacuum in order to remove any trapped gases. These measurements are made at 230° C. A Gottfert Rheotester capillary rheometer with a die possessing a length-to-diameter ratio of 30 is used. A Rabinowitsch correction is applied for all of the tests. The following viscosity values are obtained:

TABLE 4

|  | Viscosity at 11 s$^{-1}$ | Viscosity at 1000 s$^{-1}$ |
| --- | --- | --- |
| Ungrafted SMA | 810 Pa · s | 215 Pa · s |
| Grafted SMA with 1.5% of UDETA | 1710 Pa · s | 260 Pa · s |
| Grafted SMA with 3% of UDETA | 2360 Pa · s | 330 Pa · s |

An increase in the degree of grafting produces an increase in viscosity, particularly in the low-shear viscosity. Operations involving low shear rates (such as melt strength) will be greatly modified by the grafting; the greater the extent to which the SMA is grafted with UDETA, the less it will flow under its own weight, whereas the conditions of use will be affected to less of an extent, since it is the high-shear viscosity which controls the flow in application.

The invention claimed is:

1. A process for synthesis of a graft copolymer obtained by grafting:
    a copolymer (II) obtained from the copolymerization of at least two monomers, (i) the first monomer being selected from styrene and its derivatives and (ii) the second monomer containing at least one anhydride function, with molecules M-R—X (I) containing at least one heterocycle unit (M) selected from the group consisting of units (1) to (4):

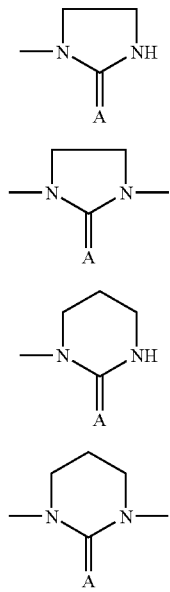

with A=oxygen, sulphur or NH;
and containing at least one chemical function (X) selected from a halogen, a primary or secondary amine function, an alcohol function, a thiol function, a carboxylic acid function or a derivative of this function and an epoxy function, the unit (M) and said function (X) being connected by a rigid or flexible chain (R),
wherein the molecules (I) are obtained from the reaction of urea with at least one compound containing at least one primary amine function (—NH$_2$) and at least one secondary amine function (—NH—), said functions being connected by a carbon chain containing at least two carbon atoms;
and the molecules (I) are contacted with the copolymer (II) in the melt state, without solvent, in an extruder, a calender, or any other mixer.

2. A process according to claim 1, wherein the copolymer (II) is obtained from the copolymerization of a mixture of monomers containing by weight, relative to the total mixture of monomers, between 0.5% and 50% of monomer containing an anhydride function.

3. A process according to claim 1, wherein the monomer containing an anhydride function is maleic anhydride.

4. A process according to claim 1, wherein the molecules (I) are obtained from the reaction of urea with at least one compound selected from alkylene amines, amines, amino alcohols and amides.

5. A process according to claim 1, wherein the function (X) is a primary or secondary amine function or an alcohol function.

6. A process according to claim 1, wherein the unit (M) of the molecule (I) is the unit (1), which is an imidazolidone heterocycle with A=oxygen.

7. A process according to claim 6, wherein the molecule (I) is selected from the molecule 1-(2-[(2-aminoethyl)amino] ethyl) imidazolidin-2-one (UTETA), the molecule, 1-[(2-{2-[(2-aminoethyl)amino]ethyl}amino)ethyl]imidazolidin-2-one (UTEPA), and the molecule 2-aminoethylimidazolidinone or 1-(2-aminoethyl)imidazolidin-2-one(UDETA).

8. A process according to claim 1, wherein the chain (R) is a linear or branched alkyl chain composed of one to 30 carbon atoms, a ring or a succession of alkyl or aryl radicals joined by bridges —C(O)O—, OC(O), C(O), —O—, —S—, —NH—.

9. A process according to claim 8, wherein the chain (R) has a molecular mass of less than 1000 g/mol.

10. A process according to claim 1, wherein the average number of grafts is greater than 2 grafts per macromolecular chain.

11. A process according to claim 2, wherein the copolymer (II) is obtained from the copolymerization of a mixture of monomers containing by weight, relative to the total mixture of monomers, between 15% and 30%, of monomer containing an anhydride function.

12. A process according to claim 9 wherein the chain (R) has a molecular mass of less than 500 g/mol.

13. A graft copolymer consisting of:
a copolymer (II) grafted with molecules M-R—X (I) comprising a nitrogen-containing heterocyclic group,
the copolymer (II) obtained from the copolymerization of a first monomer comprising styrene or derivatives thereof and a second monomer comprising at least one anhydride function,
the molecules M-R—X (I) comprising a nitrogen-containing heterocyclic group (M) selected from the group consisting of units (1) to (4):

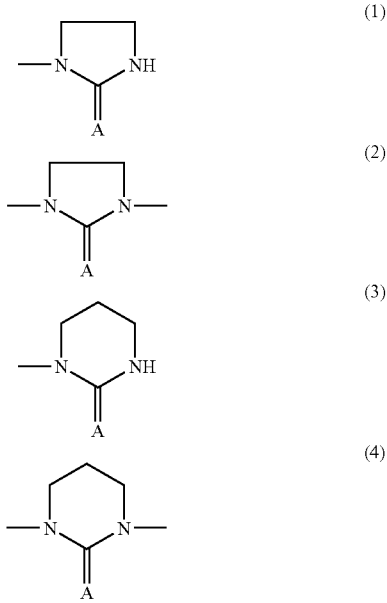

where A=oxygen, R is a hydrocarbon chain, and X comprises a primary or secondary amine function,
and the graft copolymer comprises more than two grafts per chain of the copolymer (II).

* * * * *